Oct. 23, 1962 L. R. KAHN 3,060,389

AUDIO SIGNAL PEAK ENERGY EQUALIZATION

Filed March 19, 1959

RELATIVE PHASE AND TIME DELAYS OF AUDIO SIGNAL FREQUENCY COMPONENTS

INVENTOR.
LEONARD R. KAHN

BY Mathis and Graybeal

ATTORNEYS 3,060,389

AUDIO SIGNAL PEAK ENERGY EQUALIZATION

Leonard R. Kahn, 22 Pine St., Freeport, N.Y.

Filed Mar. 19, 1959, Ser. No. 800,476
3 Claims. (Cl. 332—38)

The present invention relates to methods and means of symmetrizing unsymmetrical audio signals, and more particularly relates to methods and means for reducing and redistributing non-symmetrical peak energy of an audio signal by diversely delaying the various frequency components of the signal, whereby the maximum undistorted modulation level of a communications equipment utilizing the audio signal input, such as transmitters, modulated amplifiers and the like, is increased.

One basic problem which has long plagued sound translating communications equipments such as radiant energy transmission systems, long-line telephone circuits, and limited or uniform level type amplifiers and the like has been the difficulty in maintaining optimum modulation levels with certain types of unsymmetrical audio signals, particularly those generated by the human voice. Such audio signals characteristically have unequal energy peaks with higher peak voltages or excursions occurring on one side of the zero axis than the other. In some instances, positive to negative or negative to positive peak ratios of 6 to 8 db are often noted. In the radio broadcast field, switching between long-line telephone circuits and local program sources can likewise cause marked unbalance as to peak energies in the audio signal. Another source of trouble in this respect arises from improper phasing of microphones.

When presented an unsymmetrical audio signal, and taking the case of a voice modulated radiant energy transmitter for example, optimum operation of the transmitter for optimum received signal power requires substantially "full," i.e. 100%, modulation. When the audio signal input to such signal utilization means is unsymmetrical, unequal energy peaks of only a few db are sufficient to cause overmodulation and attendant distortion. If the modulation level is reduced to eliminate the distortion, then a loss of power occurs, causing a corresponding decrease in service range.

Long-line telephone circuits normally correct for speech asymmetry, and music seldom contains unbalanced wave forms. In the radio broadcast field asymmetrical modulation peaks often occur and are encountered primarily in use of live or tape recorded voice programs originating locally or over relatively short telephone lines. As it is a primary objective of the present invention to equally distribute non-symmetrical peak energy without disturbing symmetrical signals, the remaining modulation problem in the radio broadcast field is thereby resolved. As a result and by way of example, the methods and means of audio signal symmetrization here presented permit local voice program levels to be raised to equal those of network programs received over long-line telephone circuits, for example, without danger of overmodulation.

Also, in the case of a signal utilization circuit involv ing a limiter or uniform level type amplifier, and/or where improper microphone phasing exists, it will be likewise understood that non-symmetry in the audio signal will occasion signal distortion if the equipment is driven to optimum power output levels. In these equipments, as well, the present invention, by essentially restoring the balance of the audio signal, permits considerable improvement in overall equipment performance. Further, when speech clippers are employed, the present invention serves to remove the low-frequency bounce which normally results from D.C. shifts of clipped nonsymmetrical signals. Practice of the present invention has demonstrated that potential power improvement of up to 4 db is realized in most voice modulated translating systems.

It is another advantage of the present invention that its symmetrizing circuity involves a completely passive network, without audible effect on program sound quality. The network requires no tubes, transistors, or power source, and there is nothing to wear out or replace in normal use.

Other advantages and features of the present invention include the provision of specific circuitry for realizing non-equal time delays in the various frequency components of an unsymmetrical audio signal, such as an all-pass lattice network specifically and typically designed to accomplish sufficient redistribution of the peak energy levels of an audio signal to at least in large measure equalize the positive and negative excursions of the signal, the energy redistribution of the signal nevertheless being insufficient to create any noticeable adverse effect in received signal quality, i.e. without noticeable signal reverberation.

These and other objects, features and advantages of the present invention will be apparent to those skilled in the art from the following description of a typical and therefore non-limitive embodiment thereof, which description makes reference to the accompanying drawing, wherein.

Figure 2:
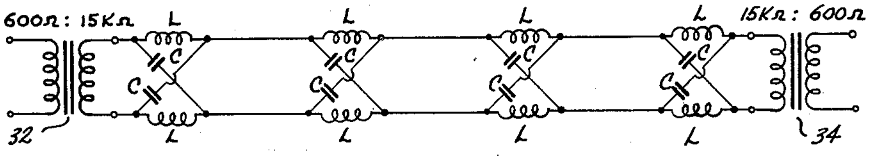
FIG. 2 is a schematic drawing of the all-pass lattice network forming a component of the system shown in FIG. 1.
Figure 3:
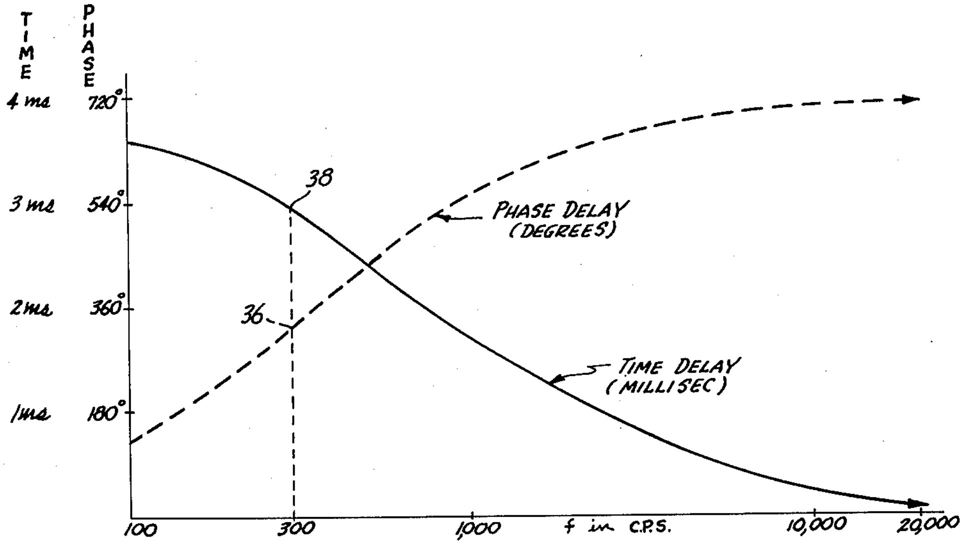

FIG. 3 presents composite semi-logarithmic graphical presentations of the phase vs. frequency and relative time delay vs. frequency relationships developed between the various frequency components of the audio signal by the lattice network shown in FIG. 2.

Figure 1:
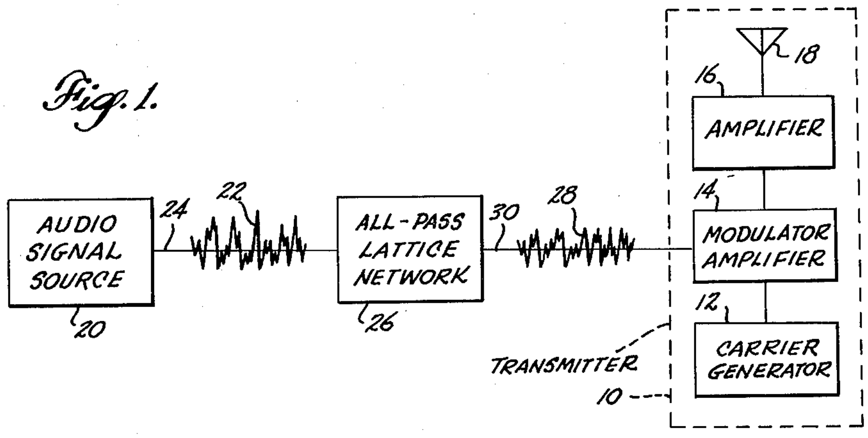
FIG. 1 is a simplified block diagram of a radiant energy transmission system, specifically a voice modulated radio transmitter, incorporating an audio signal symmetrizing means according to the present invention.

FIG. 1 presents a simplified block diagram of a typical communications equipment incorporating an audio signal symmetrizing means characteristic of the present invention, an amplitude modulated commercial broadcast radio transmitter 10 being selected by way of example. As will be readily understood, such transmitter is known, per se, in the art, and generally comprises a carrier generator 12, a modulator amplifier 14, linear amplifier output means 16, and antenna means 18. Audio signal energy modulates the carrier wave energy in modulator amplifier stage 14.

Audio signal source 20 is also conventional per se, such as a local microphone or telephone line hookup, and delivers an output audio signal characteristically or at least transiently unsymmetrical in nature, as when the audio signal is generated by the human voice. A typical unsymmetrical waveform output from audio signal source 20 is shown by waveform 22, the unbalanced zero level thereof being indicated at 24, the positive excursions in the instance selected being greater than the negative excursions.

To obtain the advantages of the present invention, an all-pass lattice network 26 is inserted between audio signal source 20 and modulator amplifier 14 of transmitter 10, which in essence functions to delay the various frequency components of audio signal waveform 22 by varying times, thereby slightly redistributing the peak energies of waveform 22 and transforming waveform 22 at the output of network 26 to a substantially symmetrical or balanced waveform 28 having a zero level indicated at 30. As will be observed, the positive and negative excursions of waveform 28 are substantially equal.

By virtue of the symmetrizing effect of network 26 on the audio signal, the balanced nature of waveform 28 permits a higher level of modulation in modulator amplifier 14 than would otherwise be possible without distortion.

Turning to a specific consideration of the details of a typical all-pass lattice network 26, as schematically presented at FIG. 2, the network comprises an input transformer 32 and an output transformer 34, input transformer 32 having a 600 ohm input impedance and a 15K ohm output impedance, and an output transformer 34 having a 15K ohm input impedance and a 600 ohm output impedance, for example. Connected in series between input transformer 32 and output transformer 34 are four identical lattice sections of a balanced nature with inductances L in each leg and capacitances C connected diagonally across each leg in the manner shown, the typical component values selected being 7 henries for each inductance L and .03 microfarad for each capacitance C.

With the component values indicated, lattice network 26 delays each audio frequency passing therethrough by a relative phase shown by the broken line graphical presentation of FIG. 3, it being notable in connection with the consideration of FIG. 3 that the total or so-called "envelope" delay of the audio signal through the network is of no consequence to the transmission system presented in FIG. 1, while the relative time delay as between the various frequency components of the audio signal and as presented by the solid line graphical presentation is the important consideration.

As will also be understood, such relative delay as to the various frequency components of the audio signal through the network is a function of the delay expressed in terms of degrees of phase and the particular frequency of the signal component. Thus, for example, even though the phase delay for a lower frequency is less than the phase delay for a higher frequency passing through the network, the time delay of the lower frequency will be greater than the time delay of the higher frequency. To illustrate, and noting the broken line plot of specific delays in degrees of phase vs. signal frequencies as presented in FIG. 3, it will be noted that a signal frequency of 150 cycles is delayed about 180° in phase while a frequency of 1500 cycles is delayed about 700° in phase, resulting in a time delay of the 150 cycle frequency of about 3.3 milliseconds and a time delay of the 1500 cycle frequency of about 1.3 milliseconds. Similarly, the delay in degrees of phase at 15,000 cycles is about 710°, and the time delay is about 0.13 millisecond.

Viewing the phase vs. frequency relationship introduced to the various audio signal component frequencies according to the relationship graphically presented by FIG. 3, the time delay of any particular frequency component is a function of the phase change in revolutions, divided by the frequency of the frequency component. Thus, the time delay vs. frequency relationship is that presented by the solid line plot. It will be noted that the greatest slope or gradient of the phase curve (i.e. most rapid change of phase), and the greatest time delay gradient both occur when the selected component values is about 300 cycles, as indicated at 36 and 38, respectively, which frequency value is what may be called a "break point," the slope or gradient of the phase curve decreasing asymptotically toward zero frequency on the one hand and decreasing asymptotically toward maximum audio frequency on the other hand. Likewise, the slope of the time delay curve decreases asymptotically toward a delay of about 4 milliseconds below about 300 cycles and decreases asymptotically toward zero delay above about 300 cycles. Illustrative examples of the relative time delay at selected frequencies are; about 3.5 milliseconds delay at 100 cycles, about 3.0 milliseconds delay at 300 cycles, about 2.4 milliseconds delay at 500 cycles, about 1.7 milliseconds delay at 1,000 cycles, about 1.3 milliseconds delay at 1,500 cycles, and about 0.13 millisecond delay at 15,000 cycles.

In practical design, this relation of time delay of the various frequency components of the audio signal has proven quite satisfactory because the important consideration with respect to the audio signal peak energies is that they be redistributed slightly and therefore equalized or symmetrized with respect to the zero level of the signal. The network presented, by introduction of relative varying time delays to the various frequency components of the signal, accomplishes such redistribution.

It is to be specifically noted and understood, however, that other relative frequency redistribution patterns can be employed to accomplish the symmetrizing effect characteristic of the present invention. Thus, by selection of different component values and different numbers of lattice sections in the lattice network, which relationships are known per se, the lattice network can be designed to generate a relative time delay for higher frequencies greater than the relative time delay for lower frequencies to similarly achieve an appropriate symmetrizing, energy redistribution pattern. Since greater delay of the higher frequencies requires more network components, however, and it is preferred to accomplish a greater time delay in the lower frequencies for circuit simplicity.

For a clearer understanding of the basic principles involved in the present invention, the unsymmetrical peak energies of the audio signal waveform 22 can be roughly analogized to a line of toy soldiers standing on a flat surface. If the surface is vibrated for a time, the alinement of the toy soldiers is upset, and there is a redistribution of the toy soldiers on the surface in a more or less random manner so that at most only a few of the toy soldiers are aligned in any given direction. Similarly, the energy redistribution involved in the present invention accomplishes a redistribution of the signal energies so that the energies are less additive at the peak points and tend to be more symmetrical about the zero level of the signal. In this respect it is also to be noted that an important feature of the present invention is that there is no adverse effect of the symmetrizing network on an input signal which is already substantially symmetrical. To again refer to the toy soldier analogy to illustrate this point, if the toy soldiers are placed on the surface in a more or less random manner, and the surface is vibrated, it is statistically practically impossible for the toy soldiers to become aligned. In other words, with a random frequency distribution of signal energies such as is characteristic of a symmetrical audio signal, the comparatively random relation of the energy will not be disturbed by the symmetrizing network of the present invention.

Another important feature of a symmetrizing delay means of the present invention is that the relative delay as between the various frequency components of the audio signal is not sufficient in any instance to be noticeable in the received signal emanating from the system. As will be readily understood, too great a relative delay among frequency components would generate a reverberation effect. In practice of the present invention, it has been found that a maximum relative time delay as between various signal frequency components of about 5 milliseconds is quite satisfactory for the symmetrizing function and creates no apparent deterioration in received signal quality.

Likewise, in practice it has been found that audio signals which are unsymmetrical even to the extent of about 20 to 30% unbalance can be symmetrized to a peak energy deviation of only about 1 to 2%.

Thus practice of the present invention in its preferred form involves use of a type of lattice network involving greater delay at relatively low frequency components of the audio signal, a delay of frequency components at and below about 300 cycles of about 3 to 5 milliseconds, coupled with delay in frequencies above about 300 cycles less than about 3 milliseconds has been found preferable.

From the foregoing discussion of a typical embodiment and manner of operation of the present invention, as well as some of general considerations pertaining thereto, various other forms, modifications and variations thereof will readily occur to those skilled in the art within the scope of the following claims.

I claim:

1. In audio signal modulation circuitry comprising an audio signal source, carrier wave generation means, and means modulating the carrier waves with the audio signal, the improvement which comprises an audio signal symmetrizing means through which an audio signal from said audio signal source is passed and fed to said carrier wave modulating means, said audio signal symmetrizing means comprising an all-pass lattice network delaying the various frequency components of said audio signal variously different times not exceeding a maximum relative delay of about 5 milliseconds to redistribute the peak energies of said audio signal without substantially affecting the intelligibility thereof, thereby enabling an optimum modulation level of the carrier wave without modulation distortion.

2. Audio signal modulation circuitry according to claim 1, wherein said all-pass lattice network is characterized by a relative time delay function progressively greater for lower frequency components as compared with higher frequency components.

3. Audio signal modulation circuitry according to claim 2, wherein said all-pass lattice network is characterized by a relative time delay function having a maximum delay gradient at a frequency of about 300 cycles per second.

References Cited in the file of this patent

UNITED STATES PATENTS

| | | |
|---|---|---|
| 1,726,578 | Nyquist | Sept. 3, 1929 |
| 2,128,257 | Lee | Aug. 30, 1938 |
| 2,173,145 | Wirkler | Sept. 19, 1939 |
| 2,392,476 | Hodgson | Jan. 8, 1946 |
| 2,468,832 | Montgomery | May 3, 1949 |